Aug. 12, 1958  A. DI NARDO ET AL  2,847,434
PRODUCTION OF CHEMICALS
Original Filed Dec. 30, 1953
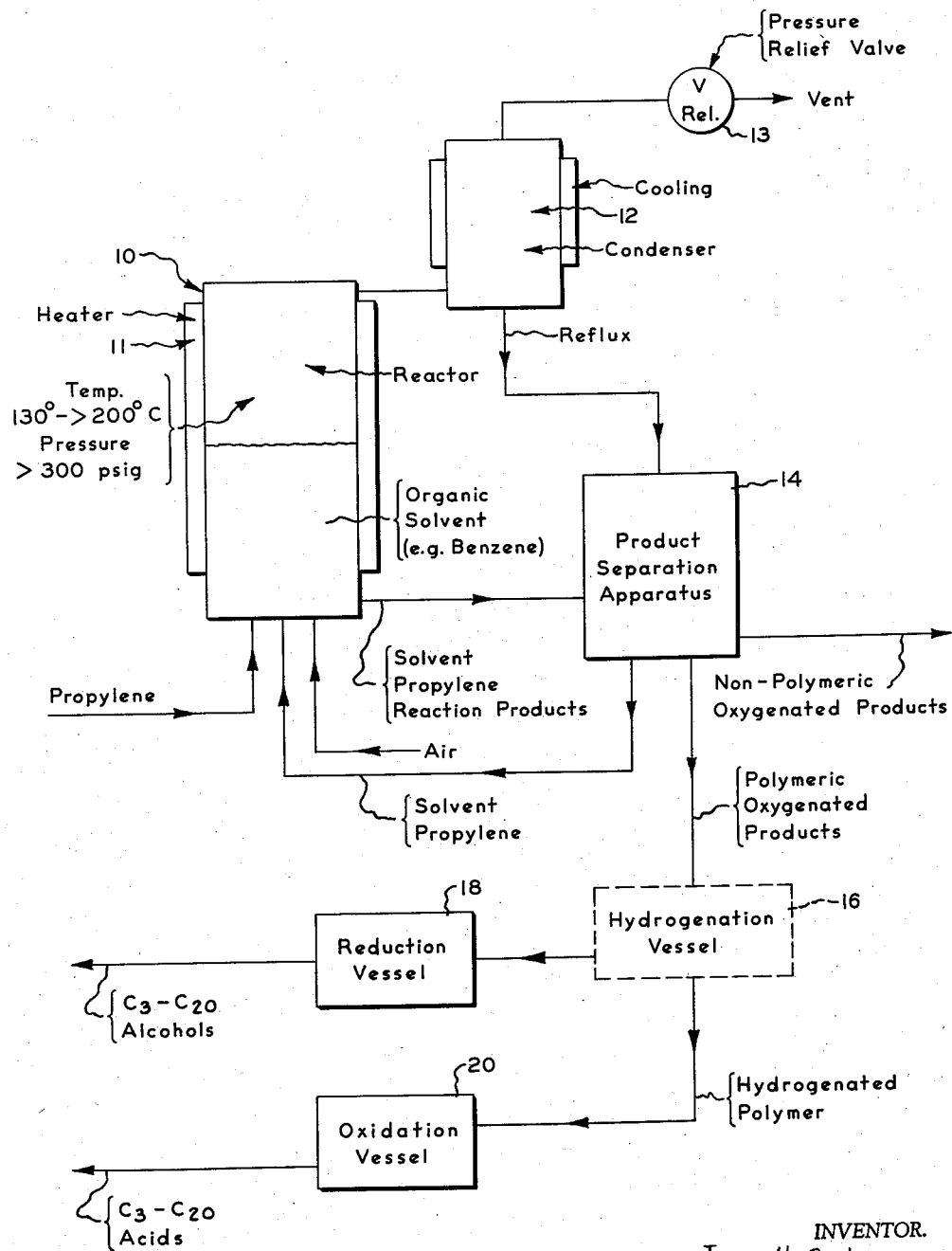
INVENTOR.
James H. Gardner
BY Albert DiNardo
Nat C. Robertson
Wilfred J Baranick
ATTORNEY ZUnited States Patent Office 2,847,434
Patented Aug. 12, 1958

2,847,434
PRODUCTION OF CHEMICALS

Albert Di Nardo, Jamaica Plain, James H. Gardner, Weston, and Nat C. Robertson, Wellesley, Mass., assignors to Escambia Chemical Corporation, Pace, Fla., a corporation of Delaware Original application December 30, 1953, Serial No. 401,346, now Patent No. 2,824,142, dated February 18, 1958. Divided and this application November 18, 1957, Serial No. 697,288

4 Claims. (Cl. 260—413)

This invention relates to the production of chemicals and in particular to the conversion of propylene to polymeric materials useful in the manufacture of high molecular weight acids. This application is a division of copending application Serial No. 401,346, filed December 30, 1953, now Patent No. 2,824,142.

A principal object of the present invention is to provide a method for producing good yields of oxygenated polymeric materials by the oxidation of propylene.

Still another object of the present invention is to produce novel polymeric materials and derivations thereof.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

The present invention is directed to the manufacture of valuable polymeric materials by the oxidation of propylene. These polymeric materials are preferably obtained by oxidizing propylene in an organic solvent at a relatively high pressure and at elevated temperatures on the order of 130° C. and above. This oxidative polymerization is preferably achieved by passing an elemental-oxygen-containing gas upwardly through an organic solvent containing a high concentration of propylene, preferably above about 15 mole percent.

The raw polymer, as obtained from the above reaction, comprises compounds containing from 2 to 6 or more propylene residues per molecule. These molecules may contain double bonds, ester linkages, carboxy groups, hydroxy groups (primary and secondary), carbonyl groups and alkoxy groups. The polymer contains, on the average, at least one oxygenated functional group per molecule, and an appreciable proportion of the molecules present may be difunctional. The quantity of oxygen present in the polymer lies between about 5% and 20%. However, the polymer more generally contains between about 10% and 15% oxygen. An appreciable proportion of the molecules present in the polymer also contains at least one double bond, thus accounting for its moderate unsaturation.

The raw polymer is virtually insoluble in water and has a very characteristic but not unpleasant odor. The average molecular weight of the raw polymer has been found to be consistently above about 100 and generally on the order of about 200. It has also been ascertained that this raw polymer has a boiling point range of from about 100° C. to above about 350° C. When fractionated, the lighter cuts are mobile, the intermediate cuts fairly mobile, and the heavy cuts viscous. The residue is semi-solid. Moderately stable emulsions tend to form when the polymer or its ether solutions are shaken with water.

The nature of the polymer depends to a certain extent on the character of the organic solvent employed in the oxidation reaction. When the solvent is an aliphatic organic compound, such as tertiary butyl alcohol, the polymer is essentially aliphatic.

The raw polymeric material may be subjected to a wide range of subsequent modification treatments, with or without preliminary partial separation of its constituents. Among these further modification treatments are reduction or hydrogenation, oxidation, hydrogenolysis or acetylation, or combinations of these reactions. When monobasic or dibasic acids are the desired end product, the raw polymer may be directly oxidized to the corresponding acids. In some cases, it may be desirable that the carbon-to-carbon double bonds present in the raw polymer be saturated with hydrogen prior to any extensive modification of the polymer.

The polymers produced by the present invention, and particularly their acid derivatives, have considerable utility. They may be used as components of synthetic lubricants, viscosity index improves and pour-point depressants for petroleum lubricants. Accordingly, fairly wide ranges of molecular structures and molecular weights may be utilized. The same is often generally true of the use of these materials as plasticizers. The polymeric acids may also be more closely fractionated to provide valuable chemical intermediates for the manufacture of resins such as polyesters and the like. Equally, these materials may be converted to synthetic detergents, emulsifiers, wetting agents and surface active materials in general.

Specific detailed methods of practicing the present invention are set forth in the following non-limiting examples. In these examples, the reference numerals indicate the appropriate sections of the flow sheet illustrated in the drawing.

*Example 1*

The organic solvent, 1500 mls. of benzene, 102 cc. of water containing a phosphate buffer at pH 6.5, and 1.4 grams of manganese propionate catalyst, were charged to a high pressure reactor 10. The reactor was sealed and charged with 314 grams of propylene. The reactor was put under about 300 p. s. i. g. of nitrogen and brought up to the operating temperature within the range of 210–230° C. by means of a heater indicated at 11. The pressure relief valve 13 was then adjusted to maintain a pressure of about 750–800 p. s. i. g. A steady rate of air feed of between 4 to 5 standard cubic feet per hour was commenced. Propylene was fed to the reactor at a rate to make up for the loss of propylene in the purge gas and for that which reacted. During a run of about five hours' duration, 522 grams of propylene were fed to the reactor. The feed rate of propylene was adjusted so as to maintain the mole percent of the propylene in the solvent at above about 25%. After termination of the run, the benzene and water layers were separated. The benzene layer was washed exhaustively with water, the washing being added to the original aqueous phase. The phases were then distilled separately to recover volatiles and, in the case of the benzene solution, to recover the solvent from the polymer. The above run produced the following materials, the yields of which are indicated as grams of product per 100 grams of propylene consumed:

|  | Grams |
|---|---|
| Propylene glycol | 26.80 |
| Polymeric oxygenated materials | 73.49 |
| Carbon oxides | 20.23 |
| Other material | 12.93 |

In the above example, the solvent for the oxidations was benzene. As example of the use of tertiary butyl alcohol as an alternate solvent is given in the following non-limiting example:

*Example II*

A similar oxidation of propylene was carried out under essentially the same conditions (of temperature, pressure, catalyst, etc.) as were present in Example I. However, in this example, the solvent consisted of 1500 mls. tertiary butyl alcohol buffered to a pH of 6 and charged with 112 grams of propylene. About 427 grams of propylene were fed to the reactor during the run. The products isolated from the reaction are indicated below as grams of product per 100 grams of propylene consumed:

| | Grams |
|---|---|
| Propylene glycol | 30.60 |
| Polymeric oxygenated materials | 55.69 |
| Acids (principally $C_1$–$C_4$) | 40.06 |
| Carbon oxides | 49.30 |
| Other materials | 1.94 |

*Example III*

A similar oxidation of propylene was carried out under essentially the same conditions (of temperature, pressure, catalyst, etc.) as were present in Example I. However, in this example, the solvent consisted of 1500 mls. of anhydrous tertiary butyl alcohol with no buffer and charged with 193 grams of propylene. About 692 grams of propylene were fed to the reactor during the run. The products isolated from the reaction are indicated below as grams of product per 100 grams of propylene consumed:

| | Grams |
|---|---|
| Propylene glycol | 30.1 |
| Polymeric oxygenated materials | 67.5 |
| Acids (principally $C_1$–$C_4$) | 26.6 |
| Carbon oxides | 27.2 |
| Other materials | 10.0 |

When acids are desired as the end product, they can be obtained from the oxygenated polymeric materials, as is illustrated in the following non-limiting example:

*Example IV*

Oxygenated polymeric material obtained from the oxidation of a propylene in tertiary butyl alcohol solvent (similar to Example II) was hydrogenated over Raney nickel at 140° C. under a pressure of about 2500 p. s. i. g. The hydrogenated polymer was then oxidized by adding dropwise over a period of 4 hours, 138.2 grams of the polymer to a boiling solution of 1500 grams of 70 percent nitric acid containing 1.7 grams of ammonium metavanadate as catalyst. The organic acids were isolated from the reaction mixture by employing several of the well-known separation techniques. From the nitric acid oxidation of 100 grams of propylene oxidation polymer, the following acids were obtained:

| | Grams |
|---|---|
| $C_3$–$C_7$ monobasic acids | 9.35 |
| $C_8$–$C_{20}$ monobasic acids | 11.00 |
| $C_5$–$C_{16}$ dibasic acids | 9.32 |

Referring now to the drawing, there is illustrated a flow sheet which embodies one continuous method of practicing the present invention. In the flow sheet, there is shown a reactor 10 charged with an organic solvent such as benzene and an initial quantity of propylene. The reactor 10 is maintained at a pressure above about 300 p. s. i. g. and at a temperature above about 130° C. by means of a heater indicated at 11. The preferred quantities of air and propylene are fed to the reactor 10. Propylene and other materials are continuously refluxed by means of a condenser 12 to product separation apparatus 14. The reaction products, along with some solvent and unreacted propylene, are also withdrawn from the reactor 10 to the product separation apparatus 14. The various products of the reaction mixture are isolated in the product separation apparatus 14. Solvent and unreacted propylene are recycled back to the bottom of the reactor 10. The oxygenated polymeric materials may be drained into a hydrogenation vessel 16 where they may be partially hydrogenated to saturate the carbon-to-carbon double bonds. However, it is usually preferred to reduce or oxidize the raw polymer directly to the desired alcohols or acids, thus eliminating the partial hydrogenation step which is indicated by the dotted configuration at 16. The hydrogenated polymer may then be divided into two streams. One stream may be directed to a reduction vessel 18 wherein the hydrogenated polymer is subjected to more vigorous reducing means so as to reduce carbonyl and ester groups to produce a mixture of alcohols having carbon numbers of from about $C_3$ to about $C_{20}$. The second stream of hydrogenated polymer may be directed to an oxidation vessel 20 wherein it may be oxidized to a mixture of monobasic and dibasic acids having carbon numbers of from about $C_3$ to about $C_{20}$.

While several limited examples of the present invention have been discussed above, it should be pointed out that numerous modifications may be made without departing from the scope of the invention. For instance, in the above examples, the concentration of the propylene is rather high during the oxidation. While not essential to the operation of the process, this aspect of the invention has been found to increase greatly the amount of oxygenated polymeric material produced per 100 grams of propylene consumed. In this connection, it has been found that best results are achieved when the mole percent of porpylene in the solvent is maintained greater than about 15% of the reaction mass. This concentration is preferably greater than about 20% and, in the above specific examples, was actually maintained greater than 25%.

Equally, numerous solvents other than the preferred benzene and tertiary butyl alcohol can be employed in the oxidation reaction. It is preferred that the solvent be relatively inert to oxygen at the reaction temperatures and that it not be consumed during the reaction except in those cases where the solvent, due to its consumption, greatly adds to the value of the polymeric material obtained.

The manganese propionate (of about 0.1% concentration) is a well-known oxidation catalyst. Other manganese salts or salts or oxides of metals of variable valence are equally effective. An important purpose of utilizing an oxidation catalyst is to prevent the creation of large concentrations of dangerously explosive hydroperoxides. It is believed that the metal walls of the reaction chamber may have sufficient catalytic effect to prevent the formation of such hydroperoxides. Similarly, while the use of a phosphate buffer solution is quite effective, numerous other well-known buffer solutions may be employed.

The range of operating pressures and operating temperatures is quite broad and can be varied within considerable limits. With regard to the pressure, it should be pointed out that it is preferably maintained above 300 p. s. i., but that considerably higher pressures may be utilized where design considerations indicate the desirability of such higher pressures. The temperature within the reactor may be varied between about 130° C. and 250° C. or higher, the temperature in all cases remaining below the critical temperature of the solvent.

The various modification procedures described above are equally subject to considerable variation without departing from the scope of the invention. In regard to oxidation, this may be achieved in numerous alternative fashions, such as by further air or oxygen treatment at elevated temperatures, ozonization, treatment with sulfur, sulfides and bases such as ammonia or quinaline, or other well-known methods of oxidation. When acetylation of the raw polymer is desired, this may be achieved by well-known methods such as treatment with acetic anhydride.

Since certain changes may be made in the above process and product without departing from the scope of the invention herein involved, it is intended that all matter contained in the above description, or shown in the accompanying drawing, shall be interpreted as illustrative and not in a limiting sense.

What is claimed is:

1. The process which comprises the steps of dissolving propylene in an organic solvent selected from the group consisting of inert nonalkylated aromatic and inert aliphatic compounds, passing an elemental-oxygen-containing gas into said solution while the solution is held under pressure to oxidize and polymerize said propylene to a liquid polymeric material, maintaining said solution at a temperature above about 130° C. while said gas passes therethrough, said polymeric material being moderately unsaturated, the majority of said material containing at least two propylene residues per molecule, there being, on the average, at least one oxygenated functional group for each molecule, said functional group being from the class consisting of the hydroxy, carbonyl, carboxy, alkoxy and ester groups, and oxidizing substantially all of the oxidizable functional groups of the polymeric material resulting from the reaction to carboxy groups to produce acids having a carbon number greater than three.

2. A process according to claim 1 wherein said organic solvent is benzene.

3. A process according to claim 1 wherein said organic solvent is tertiary butyl alcohol.

4. The process according to claim 1 wherein substantially all of the oxidizable functional groups of the polymeric material are oxidized to carboxy groups to produce a mixture predominating in acids having a carbon number of between six and twenty.

References Cited in the file of this patent

UNITED STATES PATENTS

| | | |
|---|---|---|
| 1,681,238 | James | Aug. 21, 1928 |
| 1,721,959 | James | July 23, 1929 |
| 1,921,381 | Beller et al. | Aug. 8, 1933 |
| 2,048,662 | Luther et al. | July 21, 1936 |
| 2,475,605 | Prutton et al. | July 12, 1949 |
| 2,551,642 | Garwood et al. | May 8, 1951 |
| 2,644,837 | Schweitzer | July 7, 1953 |
| 2,725,344 | Fenske et al. | Nov. 29, 1955 |
| 2,726,255 | Walker et al. | Dec. 6, 1955 |
| 2,769,846 | DiNardo et al. | Nov. 6, 1956 |

UNITED STATES PATENT OFFICE
CERTIFICATE OF CORRECTION

Patent No. 2,847,434                                                            August 12, 1958

Albert Di Nardo et al.

It is hereby certified that error appears in the printed specification of the above numbered patent requiring correction and that the said Letters Patent should read as corrected below.

Column 2, line 21, for "improves" read -- improvers --; line 72, for "As" read -- An --; column 4, line 30, for "porpylene" read -- propylene --.

Signed and sealed this 25th day of November 1958.

(SEAL)
Attest:

KARL H. AXLINE
Attesting Officer

ROBERT C. WATSON
Commissioner of Patents